Nov. 26, 1940.　　　J. G. HEASLET　　　2,222,904
TRACTOR STEERING MECHANISM
Filed April 5, 1940
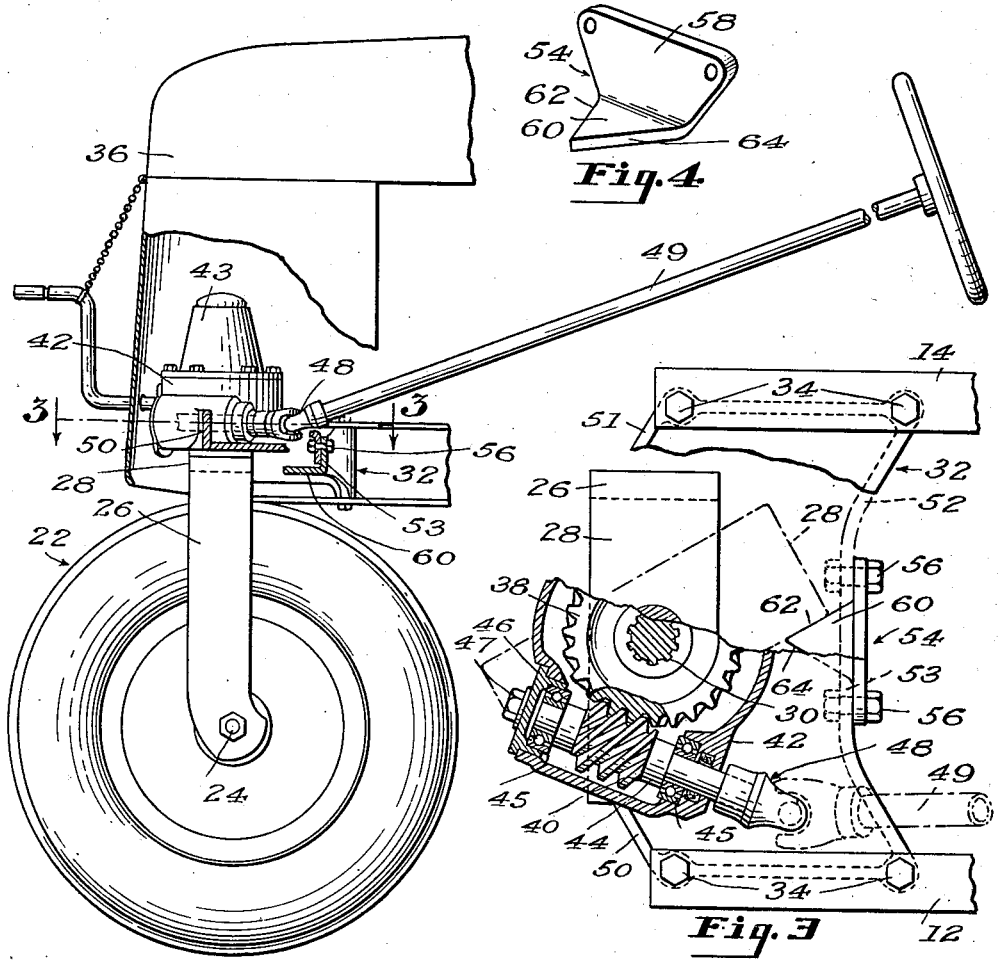
INVENTOR
JAMES G. HEASLET
BY George Douglas Jones
ATTORNEY Patented Nov. 26, 1940

2,222,904

UNITED STATES PATENT OFFICE 2,222,904

TRACTOR STEERING MECHANISM

James G. Heaslet, Hudson, Ohio, assignor to The Cleveland Tractor Company, Cleveland, Ohio Application April 5, 1940, Serial No. 328,142

4 Claims. (Cl. 280—92)

The present invention pertains to the construction of tractors, and more particularly, to steering mechanism limiting means for a wheeled tractor of the agricultural type having a single front steerable wheel.

A major object of the invention is to provide improved steering mechanism for the purpose indicated which will be exceptionally compact in the arrangements of its parts and of simple, rugged construction.

As an additional object, it is intended to provide a readily replaceable stop member for cooperation with the forks or other means supporting the steerable wheel.

Another object of importance is the provision of a unitary cross frame member which has as an integral part a housing for certain elements of the steering gear mechanism which must be enclosed and well lubricated.

Other features of improvement are to be recognized in the specific arrangement of the steerable wheel post or spindle with respect to the worm wheel gear and worm which are used to control steering.

Further novel features of improvement contributing to ease of operation and assembly will be apparent from reading the following detailed description of an illustrative embodiment of the invention in connection with the accompanying drawing, in which Fig. 1 is a top plan view of a wheeled tractor;

Fig. 2 is a side elevation of the front end of the Fig. 1 tractor with certain parts shown in section;

Fig. 3 is a fragmentary horizontal section of the steering mechanism as viewed on the line 3—3 of Fig. 2; and Fig. 4 is a perspective elevation of a stop member forming part of the steering mechanism.

Tractors of the type which has been illustrated usually are provided with a generally rectangular frame construction 10 having a pair of longitudinal frame members in the form of structural channels 12 and 14. All of the frame members will be formed from suitable metal, and if desired, may be united as an integral forging or casting.

A power plant 16, preferably an internal combustion engine, is suitably mounted on the frame construction 10 and arranged to drive a pair of rear wheels 18, 18 through a rearwardly extending propeller shaft 20 in a way which is common and well understood. At the forward end of the tractor, a single, pneumatic tired steerable wheel 22 is mounted on a front axle 24 between a pair of forks 26, which forks are provided with a transverse connecting member 28, in this instance an integral one, across their upper ends. The forks 26 are positioned centrally of the frame 10 and carry an upstanding post or spindle 30 which is revolvably mounted and supported by a rigid transverse frame member 32 through which it extends vertically. The frame member 32 is in the form of a cast or forged supporting plate which is bolted at 34, 34 to the forward ends of the frame channels 12 and 14 somewhat in advance of the engine 16.

An encasing shell such as a bonnet or hood 36 covers the engine 16 and the upper ends of the forks 26 and their spindle 30.

The forks 26 are turned and the wheel 22 rotated for steering by a worm gear 38 which is splined to spindle 30 and in mesh with a worm 40 mounted for rotation in a housing member 42, which by preference is made an integral part of the transverse frame member 32. It will be observed in Figs. 2 and 3 that the housing member 42 forms the front extremity of the member 32, and that the worm 40 is located to one side of the housing 42 and nearer the frame member 12. Housing member 42 is surmounted by a removable housing cap 43, the details of which form no part of the present invention.

Note is to be taken that the worm 40 is formed intermediate the ends of a shaft 44 which is supported in the housing member 42 on either side of said worm by suitable bearings such as 45, 45. A cap 46 serves as an enclosing portion of the housing member 42 and is secured or retained by two cap screws 47 located at the top and bottom of the cap. By means of a convention, universal joint 48, the rearward end of shaft 44 external of the housing member 42 is operatively connected to a steering column 49 which may be extended rearwardly of the tractor to a position between and above the wheels 18, 18, as shown in Fig. 1.

Referring again to the transverse frame member or supporting plate 32, it will be seen that upwardly turned, forward edge portions or flanges 50 and 51 extend outwardly and rearwardly from the integral housing member 42, and that said plate is also provided with a downwardly turned, vertical edge or flange 52 at its opposite end. The rearward flange 52 includes a straight central portion 53 for the purpose of supporting inwardly of the forks 26 an angle-shaped plate or stop member 54, the nature of which is clearly shown in Fig. 4. Attaching bolts 56, 56 or other suitable means may be employed detachably to secure the stop member or abutment means 54 centrally of the rear end of transverse frame plate 32 in a rigid manner. The stop member 54 is symmetrical and comprises a vertical leg 58 which engages the back face of the vertical flange portion 53 (Fig. 2) and a horizontal leg 60 having the shape of an isosceles triangle with rearwardly and outwardly extending abutment edges 62 and 64 on its right and left sides, respectively. Fig. 3 shows clearly the essential relation of the abutment edges 62 and 64 to the wheel forks 26, and particularly, the integral transverse portion 28 which connects the upper ends of said forks. The stop member 54 is disposed in a vertical position where it will be engaged by the forks 26 and their transverse connecting member 28 when the wheel 22 is caused to turn a predetermined distance to either an extreme right or left position, illustrated by the dotted line showings of Fig. 1. Further note is taken that the abutment edges 62 and 64 have such an angular position that engagement with the adjacent face of the forks 26 and their cross member 28 will be along a surface of appreciable length, thus minimizing wear and breakage. That is to say, the abutting portions of fork member 28 and stop member 54 are shaped for complemental engagement.

With the use of stop or abutment means such as have been disclosed herein, it is impossible to turn the forward steerable wheel 22 into a non-rotating position across the end of the tractor frame 10 in which it will act as a brake and seriously retard all forward movement, with great strain to its supporting spindle or post as well as forks. The manner in which the steering mechanism for a tractor has been combined with the frame thereof results in a greatly simplified construction, the elimination of parts, and attendant economies in construction.

Certain apparent variations may be made in the details of construction without departing from the scope of the appended claims.

Having thus described my invention, what I claim as novel and desire to secure by Letters Patent of the United States is:

1. In combination with a tractor having a front steerable wheel, a generally rectangular frame, and a propelling engine mounted rearwardly of the forward end of the frame; a pair of joined forks for supporting the steerable wheel; a spindle extending from the top of the forks at their juncture and revolvably supported by the frame in a central position in advance of the engine; means including a steering column for turning the forks through their spindle; and a stop member rigidly carried by the frame in a position alternatively to engage the back of each of the forks and prevent excessive turning of the steerable wheel, said stop member having a pair of abutment faces which correspond in shape to the respective portions of the forks which they are adapted to engage.

2. In a wheeled tractor having a forward steerable wheel, the combination comprising a pair of longitudinal frame members; a rigid transverse frame member extending across the forward end portions of the longitudinal frame members, said transverse frame member being formed to provide an integral, central housing member; a spindle extending vertically through the transverse frame member and the housing member and revolvably supported thereby; forks for the steerable wheel connected to the lower end of said spindle; a gear train disposed within the housing member and arranged to control rotation of the spindle; and abutment means rigidly secured to the transverse frame member, said abutment means being constructed and arranged to engage the forks when they are turned a predetermined distance in either direction.

3. In combination, a tractor frame; forks mounted at one end of the frame for rotation about a vertical axis; a steerable wheel rotatably supported by said forks; means for turning the forks for steering; and stop means rigidly joined to the frame and arranged to engage the forks to limit turning in either direction, said stop means having an isosceles triangular portion the sides of which engage opposite portions on the adjacent face of the forks.

4. In combination, a tractor frame; forks mounted centrally at one end of the frame for rotation about a vertical axis and provided with a connecting member which has straight, vertical abutment surfaces at the ends of its inner face; a steerable wheel rotatably supported in said forks; means for turning the forks for steering; and a triangular-shaped stop member rigidly joined to the frame inwardly of the forks and extending horizontally in such a position that two of its adjacent sides are alternatively engageable by the abutment surfaces of forks after they have been turned a predetermined amount, said stop member being disposed symmetrically with respect to a vertical plane extending longitudinally of the frame and including the vertical axis of rotation of the forks.

JAMES G. HEASLET.